United States Patent Office 3,629,161
Patented Dec. 21, 1971

3,629,161
IONENE MEMBRANE SEPARATOR
T. O. Paine, Administrator of the National Aeronautics and Space Administration, with respect to an invention of Jovan Moacanin and Ho Yet Tom, both of Los Angeles, Calif.
No Drawing. Filed Sept. 24, 1969, Ser. No. 860,781
Int. Cl. C08f 29/30, C08g 49/04
U.S. Cl. 260—2.1 E
11 Claims

ABSTRACT OF THE DISCLOSURE

A water-insoluble, cationic, permselective membrane comprising a hydrocarbon, quaternary nitrogen-containing ionene polymer cross-linked to a polyvinyl alcohol substrate.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION (1) Field of the invention

The present invention relates to a permeable membrane and more particularly, this invention relates to a water-insoluble polyelectrolytic membrane.

(2) Description of the prior art

Permselective materials allow smaller ions to pass through the membrane while preventing ions of the heavier metals from migrating. In free diffusion, the solvent and solute move relative to each other and a single transport coefficient relates flow and concentration. However, when a membrane is introduced into the solution the transport is additionally influenced by the interaction of the solute and solvent with the membrane.

The ionic character of the membrane is one factor which can influence the transport of ions and permselectivity of the membrane. For example, the current polyethylene-acrylic acid membranes have a hydrocarbon backbone but the anionic acrylic acid groups are distributed at random along the hydrocarbon backbone.

Various types of batteries require separator membranes. The reliability and permselectivity is one of the key factors that determines the lifetime of the battery. For example, in a silver-zinc battery, ideally, the battery separator membrane should allow charge transfer to a carrier such as OH, but should prevent silver and zinc ion species from leaving their respective half-cells and thus avoid internal short circuits. The separator membranes presently available have not been completely effective in avoiding internal short circuiting of these batteries.

OBJECTS AND SUMMARY OF THE INVENTION

It is therefore an object of the invention to provide an improved water-insoluble permselective membrane.

A further object of the invention is the provision of permselective membranes containing a uniform distribution of cationic groups.

Another object of the invention is to provide a permselective membrane in which the repetition rate of cationic groups can be varied at will.

Yet another object of the invention is the provision of a water-insoluble cationic permselective membrane exhibiting improved morphological and electrical properties.

These and other objects and many attendant advantages of the invention will become apparent as the description proceeds.

Novel polyelectrolytic polymers termed "ionenes" are disclosed in copending application Ser. No. 678,501 filed Oct. 27, 1967, now abandoned, the disclosure of this application being incorporated herein by reference. The solubility of these polymers in water renders them unsuitable for use in aqueous environments such as encountered in battery separators.

In accordance with the invention, water-insoluble film is prepared by casting a mixture of an ionene and a hydrophilic substrate polymer in the presence of a cross-linking agent.

The invention will now become better understood by reference to the following detailed description when considered in conjunction with the accompanying drawings.

DESCRIPTION OF THE PREFERRED EMBODIMENTS

The ionene polymers are selected from polymers of the structure:

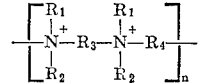

where $R_1$ and $R_2$ are each a hydrocarbon radical or may be joined into a single hydrocarbon radical. $R_3$ and $R_4$ are each a divalent organic radical such as alkylene, alkenylene, arylene or aralkylene. In either $R_3$ or $R_4$ the carbon atoms may be interrupted with oxygen or sulfur atoms such as polyoxyalkylene or polythioalkylene; $n$ is an integer such that the molecular weight is at least 1000 and is preferably from 5,000 to 50,000, typically from 10,000 to 20,000.

The ionenes are prepared by reacting a ditertiary amine of the formula:

with a diahol organic compound of the formula:

$$X—R_4—X$$

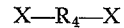

where X is a halogen preferably bromine. The reaction is preferably carried out in a high dielectric constant polar medium at temperatures below 75° C.

Exemplary ditertiary aliphatic amines are N,N,N',N'-tetramethylhexamethylenediamine (THD) or tetramethyldecamethylenediamine (TDED). Other alkylene homologues having from 4 to 100 or more carbon atoms are suitable. However, as the conductivity characteristics of the product decrease with the chain distance between positive ionic nitrogen centers the alkyl length is preferably from 4 to 20 carbon atoms.

Heterocyclic compounds can also be utilized in which case $R_1$ and $R_2$ are combined. Examples of such ditertiary amino compounds are 1,2-bis-(4-pyridyl)-ethane or 1,2-bis-(4-pyridyl)-ethene. Other ditertiary nitrogen derivatives may be formed from heterocyclic compounds such as picoline, quinoline, acridine, phenanthridine, phenanthroline, or N-alkyl piperidine, pyrrolidine, pyrroline or pyrrole.

$R_1$ and $R_2$ may be the same or different alkyl or may be alkene or aryl. The alkyl may be substituted with various substituents which will not interfere with the polymerization reaction such as halo amino or hydroxy. This pendant substitutions can be utilized for cross-linking the polymer. Since the aliphatic polymers consists of ionic amines, the nomenclature, aliphatic ionenes will be utilized in this specification. From an analogy to the naming of polyamides, the diamine and the halide are indicated by the intermediate chain length. The pendant groups on the nitrogen atom and the counterion are indicated by a prefix and a suffix, respectively. Therefore, the material resulting from the reaction of THD and 1,6 dibromohexane is tetramethyl-6, 6-ionene bromide. It is understood that in each formula negative ions such as halogen are present in the vicinity of positive nitrogen atoms.

With respect to the dihalo monomeric material, $R_4XR_4$ the halogen X is preferably bromine but may also be chlorine or iodine. The halogen atoms are attached to the central group $R_4$ which may be any one of various hydrocarbon containing radicals. $R_4$ may be alkylene, aralkylene, alkarylene, alkenylene, polyoxyalkylene. Examples of specific suitable materials are 1,3-dibromobutane, 1,5-dibromopentane, 1,10-dibromodecane, 1,6-dichlorohexane or dibromomethylbenzene.

The hydrophilic substrate comprises an organic polymer containing hydrophilic groups such as a cellulose ether, cellulose ester, ethylene oxide polyether or a vinyl ester or vinyl alcohol polymer, suitably polyvinyl alcohol. The crosslinking agent is a free radical producing agent such as azo, peroxide, percarbonate or strong redox type such as a quinone, suitably tetrachloro-o-benzoquinone (TCBQ).

In an exemplary procedure a supersaturated aqueous solution of polyvinyl alcohol is prepared. The TCBQ and ionene are added to this solution. The water mixture containing the membrane ingredients is shaken, then cast the next day onto a glass slide, containing side runners. The water is allowed to evaporate and the films are heat treated suitably at temperatures from 50° to 125° C. for ½ to two (2) hours.

The dry film thickness is preferably controlled to below 100 mils preferably 1 to 10 mils. When the ionene content of the film by weight is below 20% it does not contribute sufficient ionic character to the film. When the ionene content of the film exceeds about 75% by weight, the mechanical and solubility properties of the film are not satisfactory. The cross-linking agent should be present in amounts above about 0.1% by weight and amounts above about 5 parts by weight may render the film excessively brittle.

The following examples are offered for solely purposes of illustration and are not intended in any way to limit the invention:

EXAMPLE I

Preparation of 6,6-ionene

N,N,N',N'-tetramethylhexanediamine (one equivalent) was mixed with 1,6-dibromohexane (one equivalent) each material having been previously dissolved in an 80:20 by volume mixture of dimethylformamide and methanol. The mixture was allowed to react at room temperature for a period of 1 to 10 days. At the end of this time benzene was added to the mixture. The precipitated solid which formed was filtered, washed with benzene, and suitably dried. The yield was about 90-99%, based on theoretical, of a white crystalline solid with an intrinsic viscosity molecular weight of about 15,000.

EXAMPLE II

Preparation of ionene—PVA membrane 72-51 grade polyvinyl alcohol (PVA) was added to water and heated to 100° C. to form a supersaturated solution. Insoluble PVA was removed by filtration. TCBQ was added on a weight basis of 100:1, TCBQ to PVA. The 6,6-ionene of Example I was weighed and added to portions of the PVA-TCBQ mixture in weight proportions of 1, 20, 50 and 70 weight percent. The water mixtures of the membrane ingredients were shaken overnight, and cast the next day on glass slides in dry thicknesses of from about 50 to about 10,000 millimicrons ($\mu$m.). The water was allowed to evaporate and films were later heat treated at 100° C. for 1 hour. The films were stored in petri dishes.

The 50 weight percent ionene membrane was inspected with a stereoscan electron microscope. The dry-mounted sample was found to be pinhole-free. The sample was punctured with a 250 $\mu$m. pin and again inspected. The results indicate that the fabrication procedure produces pinhole-free membranes.

Membrane thicknesses were measured to ±31 $\mu$m. with the aid of a calibrated filar eyepiece and a stereomicroscope. The thickness was measured while dry, in water and in KCl salt solution to assess the swelling behaviour. The results are shown in the following table:

TABLE I.—TEMPORAL RESPONSES OF MEMBRANE TO BATHING MEDIA

| Thickness of dry membrane,[1] $\mu$m. | Time in 2-M potassium chloride solution, sec. | Thickness of membrane in solution, $\mu$m. | Time in water, sec. | Thickness of membrane in water, $\mu$m. |
|---|---|---|---|---|
| Control (PVA) | | | | |
| 79 | 100 | 116 | 400 | 101 |
| 109 | 300 | 99 | 3,500 | 93 |
| 115 | 600 | 92 | | |
| | 1,000 | 93 | | |
| Control (PVA) | | | | |
| 273 | 170 | 261 | 400 | 223 |
| | 250 | 258 | 800 | 318 |
| | 425 | 225 | 1,000 | 310 |
| | 1,400 | 231 | 1,350 | 299 |
| | 2,000 | 248 | 6,500 | 296 |
| | 2,700 | 267 | | |
| 1 weight percent ionene | | | | |
| 455 | 800 | 599 | 100 | 545 |
| | 1,500 | 714 | 500 | 621 |
| | 1,800 | 574 | 800 | 636 |
| | 1,950 | 672 | 1,400 | 613 |
| | 2,000 | 559 | 2,900 | 621 |
| 20 weight percent ionene | | | | |
| 827 | 460 | 586 | 1,500 | 1,247 |
| | 575 | 611 | | |
| | 750 | 594 | | |
| | 900 | 584 | | |
| | 1,800 | 583 | | |
| 50 weight percent ionene | | | | |
| 796 | 1,070 | | 670 | 17,797 |
| | 1,230 | | 1,030 | 17,999 |
| | 1,320 | | 1,460 | 16,447 |
| | 1,410 | | 2,490 | 17,688 |
| | 1,934 | 990 | | |
| 70 weight percent ionene | | | | |
| 45 | 600 | 1,226 | (Prewetted) | |
| | 1,700 | 1,188 | ∞ | 19,162 |
| | 2,080 | 1,160 | | |
| | | 1,069 | | |
| | | 1,046 | | |
| Battery separator [2] | | | | |
| 402 | 200 | 396 | 200 | 527 |
| 313 | 400 | 448 | 500 | 464 |
| 301 | 1,400 | 438 | 900 | 403 |
| 341 | | | 3,700 | 445 |
| 335 | | | | |
| 335 | | | | |
| 323 | | | | |
| 313 | | | | |
| 311 | | | | |
| 304 | | | | |

[1] Thicknesses of dry membranes measured at arbitrary times.
[2] Polyethylene-acrylic acid graft copolymer.

The results show that membrane thickness is essentially unaffected by the bathing media until the ionene content is 20 weight percent or greater. When the ionene content exceeds this level, the membrane prewetted with water contracts markedly when plunged into a salt solution.

Insoluble ionene-PVA and acrylic acid-polyethylene membranes, water-prewetted or dry were mounted between half-cells equipped with horizontal arms with a 3-mm. bore diameter for measuring volume changes. The volume measurement was accurate to ±14 $\mu$l. for a volume of about 125 ml./cell. Platinum electrodes were inserted into the cells through glass joints. Electrical measurements were taken with a high impedance millivoltmeter, an AC impedance bridge for resistance; a regulated DC power supply and an electrical timer. The transport properties for the ionene-PVA membranes were in the same range as that of the acrylic acid-polyethylene membrane of the prior art. Additionally, the transport properties of the ionene-PVA membranes of the invention varied systematically as the ionene content was increased.

It is to be realized that only preferred embodiments of the invention have been disclosed and that numerous substitutions, alterations and modifications are permissible without departing from the spirit and scope of the invention as defined in the following claims.

What is claimed is:

1. A mixed polymer composition for forming a thin, pinhole free, water-insoluble polyelectrolyte film comprising:
    a polyvinyl alcohol substrate;
    20% to 75% by weight of the composition of an ionene polymer of the formula:

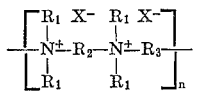

where $R_1$ is a quaternizing group selected from alkyl, alkene or aryl, $R_2$ and $R_3$ have a carbon content of from 4 to 20 carbon atoms and are selected from alkylene, alkenylene, arylene or aralkylene, X is halo and $n$ is an integer such that the molecular weight of the ionene polymer is from 5,000 to 50,000; and
    0.1 to 5% by weight of a cross linking agent selected from the group consisting of azo, peroxide, percarbonate and strong redox free radical producing agents.

2. A composition according to claim 3 in which $R_1$ is alkyl of 1 to 10 carbon atoms.

3. A composition according to claim 1 in which $R_2$ and $R_3$ are alkylene of from 4 to 20 carbon atoms.

4. A composition according to claim 1 in which the film thickness is below 100 mils.

5. A composition according to claim 4 in which the thickness is from 1 to 10 mils.

6. A composition according to claim 3 in which the cross linking agent is a quinone, the molecular weight of the ionene polymer is from 10,000 to 20,000 and X is bromo.

7. A composition according to claim 6 in which the quinone is tetrachlorobenzoquinone.

8. A method of forming a thin, water insoluble, pinhole free film comprising the steps of:
    forming an aqueous mixture of a polyvinyl alcohol substrate, 0.1% to 5% by weight of the composition of a cross linking agent selected from the group consisting of azo, peroxide, percarbonate and strong redox free radical producing agents and 20% to 75% by weight of the composition of an ionene polymer of the formula:

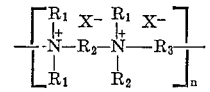

where $R_1$ is a quaternizing group selected from alkyl, alkene, or aryl, $R_2$ and $R_3$ having a carbon content of from 4 to 20 carbon atoms and are selected from alkylene, alkenylene, arylene, or aralkylene, X is halo and $n$ is an integer such that the molecular weight of the ionene polymer is from 5,000 to 50,000;
    casting the mixture onto a surface to form a thin film; and
    drying and cross linking the film by heating the film at a temperature between 50° to 125° C. for 0.5 to 2 hours.

9. A method according to claim 8 in which the cross-linking agent is a quinone.

10. A method according to claim 9 in which the agent is tetrachlorobenzoquinone.

11. A method according to claim 9 in which the molecular weight of the ionene polymer is from 10,000 to 20,000, $R_2$ and $R_3$ are alkylene of 4 to 20 carbon atoms.

References Cited

UNITED STATES PATENTS

| | | | |
|---|---|---|---|
| 2,261,002 | 10/1941 | Ritter | 260—2 |
| 3,013,100 | 12/1961 | Mendelsohn et al. | 204—296 |
| 3,105,058 | 9/1963 | Osugi et al. | 260—874 |
| 3,235,596 | 2/1966 | Nordgren et al. | 260—2 |
| 3,265,536 | 8/1966 | Miller et al. | 204—296 |
| 3,370,048 | 2/1968 | Reynolds | 260—2 |

SAMUEL H. BLECH, Primary Examiner

U.S. Cl. X.R.

136—146, 148; 260—2, 2.1 R, 13, 29.6 WA, 79, 823, 874